United States Patent [19]

Colling

[11] Patent Number: 4,524,449
[45] Date of Patent: Jun. 18, 1985

[54] SAFETY DEVICE

[75] Inventor: Jean M. Colling, Echirolles, France

[73] Assignee: Framatome & Cie., France

[21] Appl. No.: 425,898

[22] Filed: Sep. 28, 1982

[51] Int. Cl.³ .................. G06F 11/28; G06F 15/46
[52] U.S. Cl. ................................. 377/28; 371/62;
377/16
[58] Field of Search .................. 377/28, 30, 31, 32,
377/16; 371/62

[56] References Cited

U.S. PATENT DOCUMENTS

| | | | |
|---|---|---|---|
| 3,786,433 | 1/1974 | Notley et al. | 371/62 |
| 3,795,800 | 3/1974 | Nimmo | 371/62 |
| 3,919,533 | 11/1975 | Einolf et al. | 371/62 |
| 4,023,109 | 5/1977 | Shreve | 377/16 |
| 4,090,173 | 5/1978 | Sibley | 371/70 |
| 4,408,328 | 10/1983 | Wakai | 371/62 |

FOREIGN PATENT DOCUMENTS 0011312  5/1980  European Pat. Off. .
2946081  5/1981  Fed. Rep. of Germany .

Primary Examiner—John S. Heyman
Attorney, Agent, or Firm—Handal & Morofsky

[57] ABSTRACT

Safety device between a system for the control of a safety actuator and a logic circuit for controlling the actuator.

The device comprises sequential circuit for the transmission of logic signals supplied by the control system to the logic circuit, sequential checking circuit for applying to the logic circuit actuator release signals in the case of a failure of the contol system or of the tansmission circuit, the transmission of signals between the system and the logic circuit being carried out after checking the no-failure of the transmission circuit.

4 Claims, 3 Drawing Figures

SAFETY DEVICE

BACKGROUND OF THE INVENTION

The invention relates to a safety device between a safety actuator control system and a logic circuit for controlling these actuators. It applies more particularly to the testing of transmission means and systems enabling the application of urgent release signals to a safety actuator. These safety actuators are used, for example, for controlling the emergency shutdown or scram of a nuclear reactor.

It is known that a nuclear reactor, for example, comprises a large number of devices enabling the checking and monitoring of its operation. These devices are called safety actuators. In the case of incidents, it must be possible to release these actuators in an urgent manner, in such a way that their protective action can stop the incident. In nuclear reactors, the values of a certain number of physical magnitudes such as pressure, temperature, neutron flux, etc are measured at a certain number of points by means of transducers. The analog values of these magnitudes are converted into digital values, which are then compared in processing systems with reference values. These processing systems also make it possible to control one or more safety actuators. They normally supply a logic comparison signal which is, for example, of a non-zero value, when the digital values of the physical magnitudes are within a predetermined reference value range and corresponding to the normal operation of the monitored reactor or apparatus. When the physical magnitudes measured by the transducers pass beyond this safety range, the processing and control system or systems supplies logic output signals of e.g. zero value, for each of the measuring values passing beyond the safety range. These logic output signals from the processing system are sequentially applied by communication means which will be described hereinafter to the input of a logic circuit, whose outputs control safety actuators. In general, this logic circuit is designed in such a way that a protective action is initiated when at least half the redundant channels of the communication means apply to at least half the inputs of this logic circuit signals controlling the initiation of protective actions. As stated in French patent application No. 80 25068 filed on Nov. 26, 1980 in the name of the present Applicant, such logic circuits also make it possible to inhibit certain of the transmission channels for performing tests, e.g. circuits or the system located upstream of said channels. These upstream circuits can, for example, be signal amplification and processing chains connected to the aforementioned transducers.

For safety reasons, it is particularly advantageous to release the safety actuator via the logic circuit controlling it, in the case of a failure in the transmission of the logic control signals supplied by the processing and control system to the logic circuit, or in the case of a failure of the said system. At present, no safety device is known which makes it possible to simply and permanently check that the sequential transmission of the signals between a processing and control system and a logic control circuit of a safety actuator takes place without failure and also to check that the processing and control system itself is also suffering from no defect or failure.

BRIEF SUMMARY OF THE INVENTION

The object of the present invention is to obviate these disadvantages and in particular to provide a safety device between a control system of a safety actuator and a logic circuit for controlling the said actuator. This device makes it possible to simply and permanently check that the logic signals supplied by the system to the logic circuit are transmitted without any malfunction and to check that the actual control system has no malfunction or defect.

The invention also relates to a safety device between a safety actuator control system and a logic circuit for controlling these actuators, wherein it comprises sequential means for the transmission of logic signals supplied by the control system to the logic circuit, sequential checking means for applying to the logic circuit actuator release signals in the case of a failure of the control system or in the case of a failure of the transmission means, the transmission of the signals between the system and the logic circuit being carried out after checking that the transmission means have not malfunctioned.

According to another feature of the invention, the checking means comprise timing means connected between the system and the transmission means, a control clock of the said timing means, the transmission means applying to the logic circuit actuator release signals, in the case of a failure of the system, if after a predetermined time interval the timing means have not received a rearming signal from the system, said checking means also comprising means for comparing the signals supplied by the system and signals supplied by the transmission means, in such a way that in the case of a difference between these signals, an output of the comparison means applies an error signal to the system in such a way that it does not apply a rearming signal to the timing means, following the predetermined time interval, the transmission means thus applying actuator release signals to the logic circuit.

In another embodiment, the comparison means are limited to means for the rereading by the system of the state of the signals applied to the logic circuit. The comparison between the signals supplied by the system and the signals supplied by the transmission means is then carried out by the actual system.

According to another feature, the timing means are constituted by a counter, whereof the output is in a first logic state during a predetermined period corresponding to the checking of the non-failure of the system and the transmission means and to the transmission of logic signals supplied by the system, said output then being in a second logic state during said predetermined time interval corresponding to the time which elapses between on the one hand the switching of the first logic state to the second logic state and on the other hand the time when the system applies the rearming signal to the counter.

According to another feature, the said predetermined time interval has a duration less than the response time then of the logic circuit.

According to another feature, the transmission means comprise a plurality of transmission channels connecting the inputs of the logic circuit to the outputs of a register receiving the logic signal supplied by the system, each channel having two controllable switches, connected in series between an output of the register and an input of the logic circuit, the first switch being controlled by the logic level of the signal supplied by the system and coming from the corresponding output of the register, the second switch being controlled by the signal from the output of the counter, in such a way that it is open during said predetermined time interval or in the case of a failure.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
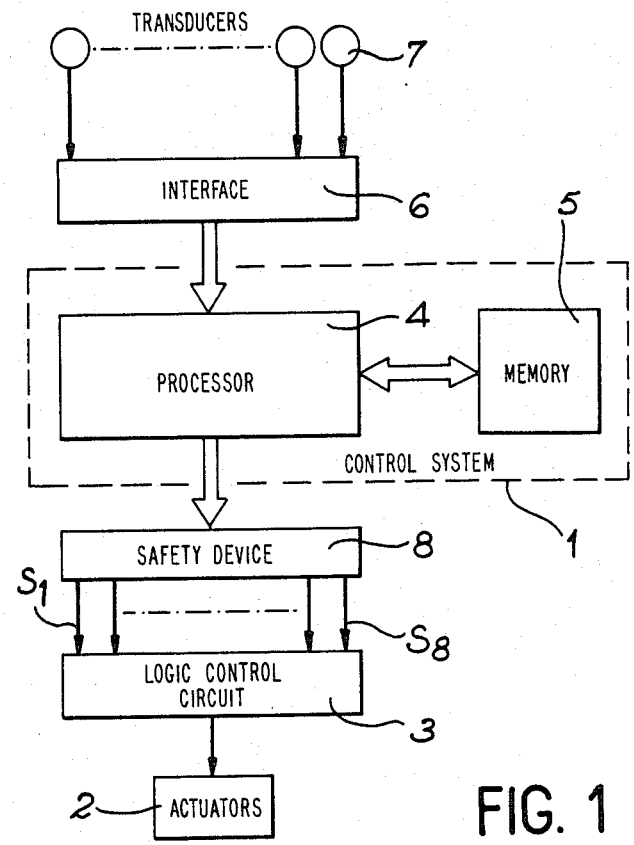
FIG. 1 diagrammatically, a safety actuator control system in which a safety device according to the invention is used.

FIG. 1 diagrammatically shows a safety means in which is involved a safety device according to the invention. This safety means comprises a system 1 enabling the control of safety actuators 2, via a logic control circuit 3. Control system 1 can, for example, be constituted by a processor or microprocessor 4, associated with a memory 5. For example, this microprocessor receives via an interface 6, measurement signals coming from transducers 7. These signals are generally analog signals, which are transformed by not shown circuits within interface 6 into digital values. The digital measurement values are compared with reference values relating to each of the measurement signals stored in memory 5. If the digital values representing the measurement signals are outside the digital safety ranges, the control system 1 supplies for these values, to logic circuit 3, logic signals controlling the urgent release of actuator 2. Generally, and as indicated hereinbefore, this urgent action is only released if a certain number of redundant logic signals reaching the inputs of logic circuit 3 are at a logic level corresponding to an urgent release control. Generally, this logic level is a low logic level: voltage absent. The device according to the invention is shown at 8 in this drawing. As will be shown in greater detail hereinafter, the logic device makes it possible to ensure a sequential transmission of the logic signals supplied by control system 1 to logic circuit 3. The device also makes it possible to apply to the logic circuit release signals of the actuator 2 in the case of a failure of control systems 1 or in the case of a failure of the transmission means (diagramatically indicated by channels $S_1 \ldots S_8$). These transmission means are constituted by several channels relating to the different protective actions and the device according to the invention makes it possible to release an urgent action in the case of a failure of one or more channels. Obviously, these transmission channels are also able to transmit logic signals for the release of actuator 2, when there is no failure or malfunction of the control system or the transmission means.

Figure 2:
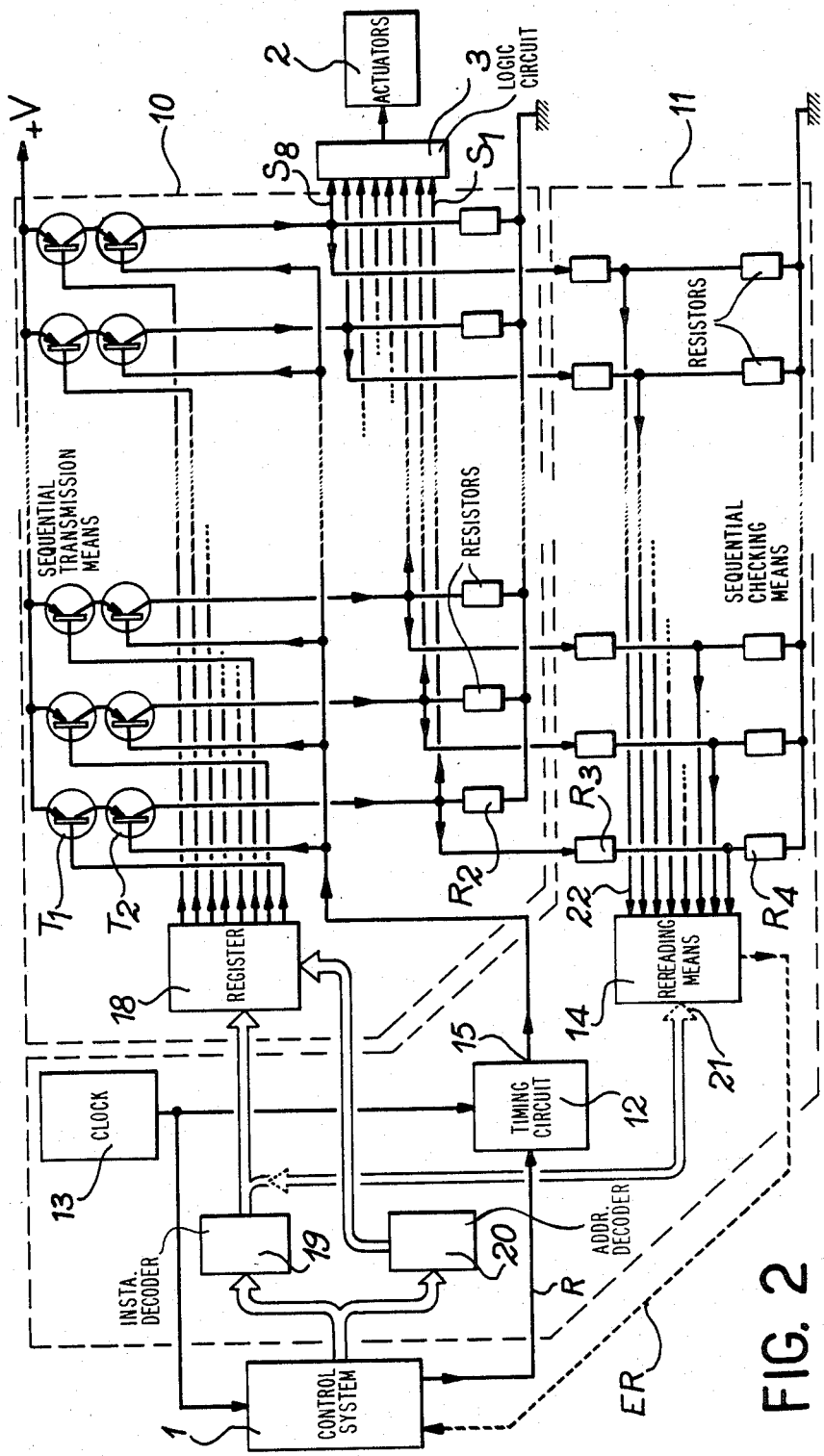
FIG. 2 in a more detailed manner, a safety device according to the invention.

FIG. 2 shows in greater detail the safety device according to the invention. The safety device comprises sequential means 10 for transmitting logic signals supplied by control system 1 to logic circuit 3. This device also comprises sequential checking means 11 enabling the application to logic circuit 3 of actuator release signals, in the case of a failure of control system 1 or transmission means 10.

The checking means 11 comprise timing means 12 constituted by a counter, whose function will be described in greater detail hereinafter. These checking means also comprise a clock 13, which controls counter 12 and which also makes it possible to synchronize control system 1. Finally, these checking means comprise rereading means 14 making it possible for system 1 to reread the state of the corresponding logic signals $S_1 \ldots S_8$ from transmission means 10. As will be shown hereinafter, these checking means make it possible to apply to logic circuit 3 actuator release signals in the case of a failure of system 1 if, after a predetermined interval of time, the timing means constituted by counter 12 have not received a rearming signal R from the system. As a result of the rereading means 14, said checking means also make it possible to return to system 1 the state of the signals applied to logic circuit 3. System 1 then compares the signals which it has supplied and the signals applied to the logic circuit. If disagreement appears, system 1 no longer applies a rearming signal R to timing means 12 following a predetermined time interval. As will be shown hereinafter, this absence of rearming leads to the application of release signals to the inputs of logic circuit 3 by transmission means 10.

As stated hereinbefore, in another embodiment, the rereading means 14 are replaced by comparison means applying to system 1 an error signal ER in the case where the signals supplied by the system and the signals received by the logic circuit do not agree. Error signal ER acts on system 1, so that the latter does not apply a rearming signal R to timing means 12 following a predetermined time interval.

Counter 12 can be rearmed and its output 15 is also in a logic state 1 during a period corresponding to the transmission of the signal supplied by system 1 and to the checking of the non-failure of the system and of transmission means 10. The output of this counter then switches to a logic state zero. This second logic state is present during a predetermined time interval corresponding to the time elapsing between on the one hand the switching time from the first logic state to the second logic state and on the other hand the time when system 1 applies rearming signal R to the said counter. As will be shown hereinafter, if it is considered that the protective action is initiated by logic levels 0 applied to logic circuit 3, the transmission of logic signals from the system to the communication channels can only take place if transistors such as $T_2$ belonging to the communication means, which will be described hereinafter, are made conductive. The transistors are made conductive when a logic level 1 is applied to their bases. The transmission of the logic signal supplied by system 1 is therefore carried out during the given period corresponding to the production of a signal having a logic state 1 to output 15 of counter 12. The second logic state of output 15 of counter 12 is a logic level 0, which blocks the transistors such as $T_2$ and which consequently makes impossible the transmission of logic signals from the control system to logic circuit 3. This logic level 0 corresponds to the application of release signals to the inputs of logic circuit 3. As will be shown in greater detail hereinafter, the aforementioned predetermined time interval is less than the response time of logic circuit 3.

The transmission means 10 comprise a plurality of transmission channels, whose outputs are represented at $S_1 \ldots S_8$ and whose number is equal to 8 in the embodiment described, but obviously this number can differ. These transmission channels connect the inputs of the logic circuit 3 to the outputs of a register 18, which receives the logic signals transmitted by system 1, for example via an instruction decoder 19 and an address decoder 20. Each transmission channel comprises two switches, which are connected in series between an output of register 18 and a corresponding input of logic circuit 3. These switches are formed by transistors such as $T_1$ and $T_2$. In the considered embodiment, these transistors are of the PNP type. The collector of transistor $T_1$ is connected to the emitter of transistor $T_2$, whilst the emitter of transistor $T_1$ is raised to a polarization voltage $+V$. The collector of transistor $T_2$ is connected to a reference earth M via a resistor $R_2$. The bases of transistors $T_2$ are connected to the output 15 of counter 12, whilst the bases of transistors $T_1$ are connected to the corresponding outputs of register 18. Thus, the first switches constituted by transistors $T_1$ are controlled by corresponding signals from register 18, whilst the second switches constituted by transistors $T_2$ are controlled by the signal from output 15 of counter 12. Transistors $T_2$ are blocked during the aforementioned predetermined time interval or in the case of a failure, as will be shown in greater detailhereinafter. The rereading means 14 permitting the comparison by the system of the signals received by logic circuit 3, receive these signals at their inputs 21 and provide them at their outputs 22. The signals received by logic circuits 3 are applied to the inputs 22 of rereading means 14, via a resistance matching dividing bridge such as $R_3,R_4$. This comparator is synchronized by the processor 4 of control system 1.

Figure 3:
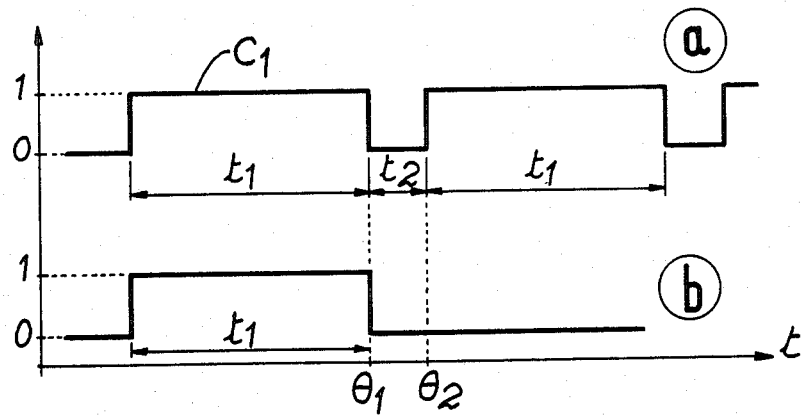
FIG. 3 a chronogram of the signals involved at certain points of the safety device.

FIG. 3 is a chronogram showing at a and b, the logic states of output 15 of counter 12 in two operating cases of the device.

At a is shown the normal operation of the device in the case where there is no failure of the control system 1 or no failure of one or more channels of the transmission means 10. In this case, counter 12 controlled by clock 13 supplies at the output signals $C_1$ of given period $t_1$. These signals have a first logic level 1 and it is during this period that the logic signals supplied by control system 1 are transmitted and checking then takes place of the non-failure of system 1 and transmission means 10 for the transmission of the logic signals of the following sequence. During this period $t_1$, output 15 of counter 12 is at logic level 1. This logic level makes it possible to render conductive the two switches constituted by transistors $t_2$. When there is no malfunction of the processing system 1 or the transmission means 10 after a predetermined time interval $t_2$, control system 1, synchronized by clock 13, applies rearming signal R to counter 12. This signal makes it possible to control the counter in such a way that its output 15 again passes to a logic state 1 during a further period of duration $t_1$.

Case b corresponds to a failure, either of control system 1, or of the transmission means 10. The case will be considered here where the transmission of the logic signals from the system to logic circuit 3 has taken place normally up to time $\theta_1$ of switching the output of counter 12 to logic level 0. In the case of a failure of control system 1, the latter does not supply a rearming signal R at time $\theta_2$ after the predetermined time interval $t_2$ separating time $\theta_2$ and time $\theta_1$, which at the output of the counter has switched over. Thus, the counter output remains at logic state 0 and the two switches constituted by transistors $T_2$ are open (transistors blocked). This corresponds to the application of logic signal 0 to the inputs of logic circuit 3, said signals causing the release of the actuator.

The process is the same during a failure of transmission means 10. Thus, during a failure of these means, system 1 acquires via rereading device 14, the state of the signals applied to the logic circuit, detects a lack of agreement between the signals which it has supplied and those which it rereads and under these conditions no longer controls the supply of rearming signal R after time interval $t_2$. Thus, as hereinbefore, the output 15 of counter 12 remains at logic state 0 beyond said time interval $t_2$, which leads to the application of release signals to the inputs of logic circuit 3 for controlling actuator 2.

It is obvious that the transmission means 10 make it possible to transmit release signals from control system 1, when there is no failure of the said system or of the transmission means 10. In this case, counter 12 supplies logic signals such as $C_1$ of logic level 1, but as the signals applied to transistors $T_1$ are at logic level 0 corresponding to failure control and the outputs $S_1$ to $S_8$ of the device are at logic level 0 corresponding to the release of actuator 2.

It is obvious that the means used could be replaced by equivalent means without passing beyond the scope of the invention.

What is claimed is:

1. A safety device between a control system for a safety actuator and a logic circuit for controlling said actuator, comprising sequential transmission means connected to the logic control circuit for the transmission of logic signals supplied by the control system to the logic circuit, these transmission means being connected to sequential checking means for applying to the logic circuit release signals, in the case of a failure of the control system or a failure of the transmission means, these checking means being connected to the control system, the transmission of the signals between the system and the logic circuit taking place after checking that the transmission means have not failed, wherein the sequential checking means comprise timing means connected between the system and the transmission means, and a clock connected to timing means for controlling timing means, the transmission means applying to the logic circuit release signals in the case of a failure of the system if, after a predetermined time interval, the timing means have not recieved a rearming signal from the system, the timing means comprising a counter, whose output connected to transmission means is in a first logic state during a predetermined time corresponding to the checking of the non-failure of the system and of the transmission means, and corresponding to the transmission of logic signals by the system, said output then being in a second logic state during said predetermined time interval corresponding to the time which has elapsed between the time of switching from the first logic state to the second logic state and the time at which the system applies the rearming signal to the counter, said predetermined time interval being shorter than the response time of the logic circuit.

2. A device according to claim 1, wherein the checking means comprises means for comparing the signals supplied by the system and signals supplied by the transmission means, in the case of a difference between these signals, an output of the comparison means applies an error signal to the system does not apply a rearming signal to the timing means after the predetermined time interval, the transmission means thus applying to the logic circuit, actuator release signals, these comparing means being connected to the system and to the transmission means.

3. A device according to claim 1, wherein the checking means also comprises rereading means for the signals from the transmission means, in the case of a difference between these signals and the signals supplied by the system, the latter no longer applies a rearming signal to the timing means after the predetermined time interval, the transmission means thus applying actuator release signals to the logic circuit, these rereading means being connected to the system and to the transmission means.

4. A device according to claims 2 or 3, wherein the transmission means comprise a plurality of transmission channels connecting the inputs of the logic circuit to the outputs of a register connected to the system for receiving the logic signal supplied by the system, each channel having two controllable switches, connected in series between an output of the register and an input of the logic circuit, the first switch being controlled by the logic level of the signal supplied by the system and coming from the corresponding output of the register, the second switch being controlled by the signal from the output of the counter, this second switch being open during said predetermined time interval in the case of a failure.

* * * * *